Jan. 9, 1923.  1,441,222
F. M. FURBER.
SHANK GOUGING MACHINE.
FILED JUNE 22, 1918.

INVENTOR:
Frederick M. Furber

Patented Jan. 9, 1923.

1,441,222

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

SHANK-GOUGING MACHINE.

Application filed June 22, 1918. Serial No. 241,309.

*To all whom it may concern:*

Be it known that I, FREDERICK M. FURBER, a citizen of the United States, residing at Revere, in the county of Suffolk and State of Massachusetts, have invented certain Improvements in Shank-Gouging Machines, of which the following description, in connection with the accompanying drawings, is a specification, like reference characters on the drawings indicating like parts in the several figures.

This invention relates to machines for operating upon stock and is herein illustrated as embodied in a machine for forming in the shank portion of a sole a groove to receive a shank stiffener.

Hitherto this groove has been cut by means of a rotary milling cutter, but the operation with such a cutter has been slow and unsatisfactory. To facilitate the operation the present invention contemplates the use of a gouging cutter inclined to the surface of a work support, and means for producing relative movement between the cutter and the support in proper directions to cause the groove to be cut. In the illustrative machine the cutter reciprocates over the work support, the support is raised and lowered at the proper times, and a gage travels with the cutter and is operated at the proper time to cause the knife to emerge from the stock.

This and other features of the invention including certain details of construction and combinations of parts will be described as embodied in an illustrative machine and pointed out in the appended claims.

Referring now to the accompanying drawings.

Figure 1:
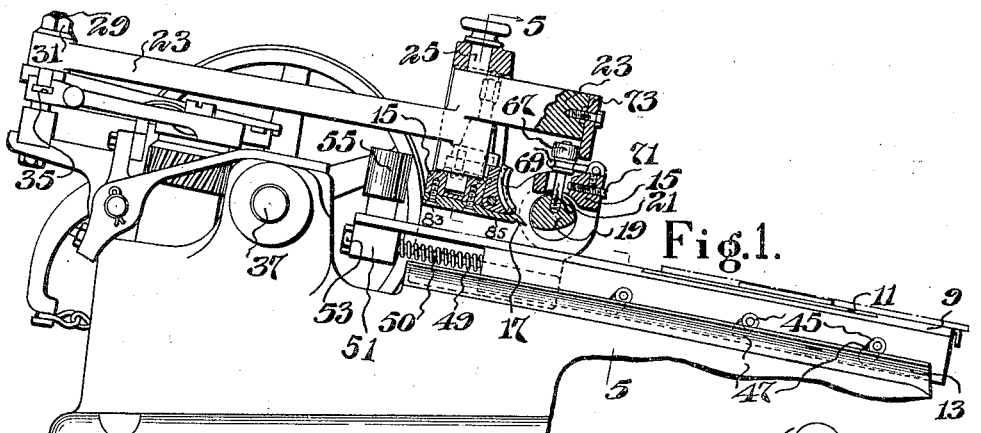
Fig. 1 is an elevation of a machine in which the present invention is embodied.

The machine is provided with a table 9 upon which is removably mounted a flat plate 11 the upper surface of which is flush with the upper surface of the table, said plate being dove-tailed into the table and fastened by screws 12, the surface of the plate and table serving as a bed for supporting the stock.

Upon ways 13 formed on the base or frame of the machine a knife carrier, herein shown as a reciprocating carriage 15, is slidably mounted, said carriage having fast thereto a knife 17. A gage or presser in the form of a mutilated cylinder 19 has trunnions at both ends which are mounted in suitable bearings in the carriage 15 and has threaded into it a pin 21 by which the gage may be adjusted in a manner presently to be described, the depth of cut of the knife depending upon the distance of the effective face of the gage above the plane of the bed. The carriage 15 is reciprocated over the bed by means of a connecting rod 23 which is pivoted near its lower end at 25 to the carriage 15 and at its upper end upon a hollow stud 27 adapted to be clamped by means of a headed pin 29 and a nut 31 to a rotatable segmental plate 33, the head of the pin being received in an undercut groove 35 in said plate. The groove 35 is struck about the axis of rotation of the plate 33 as a center, and consequently the carriage 15 is always moved in a path of fixed extent, although the point at which the movement begins and ends may be varied. The plate 33 is rotated from a power shaft 37 through a one-revolution clutch which may be of any approved type. Resting upon springs 39 and held in adjusted vertical position in opposition to the force of said springs by screw bolts 41 is a support 43 having projecting from its sides a series of rolls 45. The table 9 has two downwardly extending flanges provided with inclined slots 47 to receive the rolls 45 so that when the table is moved longitudinally it will be raised or lowered according to whether the movement is in one direction or the other. The bed is normally held, when the machine is at rest, in the lowered position shown by a spring 49 coiled about a rod 50. This rod, which is fast at one end to the frame of the machine, passes through an eye 51 attached to the under side of the table and has a stop nut 53 on its other end. In order that the table may be moved to the right and thereby raised at the proper time, said table carries a roll 55 with which an actuating member 57 is adapted to contact when the segmental plate 33 is rotated. At its rear end the actuating member is slotted, as indicated, and is held in adjusted position by the pin 29 and nut 31 which hold the upper end of the connecting rod 23.

The parts of the machine thus briefly described with the exception of the knife 17 and the plate 11, are or may be similar to the corresponding parts of the machine shown in Patent No. 1,224,918, granted May 8, 1917, upon an application filed in my name to which reference may be had for a more detained description. It will be understood, however, that when the clutch is thrown in the carriage make a single reciprocation over the table which is raised at a predetermined time during the forward movement of the carriage to cause the knife to enter the stock; and, as soon as the carriage starts back on the last half of the reciprocation, is lowered into the position shown.

The purpose of the patented machine is to produce a flap the full width of the sole on the heel portion thereof; but the present machine, as has been explained, is designed to cut a groove in the sole. To this end the gouging knife 17 is inclined to the plane of the table being herein shown as curved. This knife is dove-tailed into a suitably shaped slot 59 in a holder 61, which is fastened to the carriage 15, the holder being provided with a narrow slot 63 so that the knife may be held in adjusted position by a pinch-bolt 65. The holder 61 is fastened to the carriage by means of two posts 60 the bases of which are fastened by screws to the holder. In the upper ends of the posts are threaded sockets to receive clamping screws 62 the heads of which abut against a spaced portion of the carriage 15. In order to control the movement of the gage 19 so as to cause the knife to emerge from the stock at the desired point, the pin 21 is provided with a roll 67. A U-shaped spring 69 having one leg fastened to the carriage 15 has the other leg engaging a groove in the upper part of the pin 21 and tends at all times to hold the pin against the end of an adjustable stop-screw 71 which is threaded into the carriage. This spring is, of course, of less strength than the springs 39 which sustain the bed. The roll 67 is adapted to be engaged at times by a striker 73, herein shown as a small plate bolted to an extension on the connecting rod 23. In the position of parts shown, the roll 67 is being held to the left by the striker 73 so that the stem 21 is spaced from the stop-screw 71 and the effective face of the gage 19 is slightly below the edge of the knife. As soon, however, as the connecting-rod 23 moves a little from the position shown, the roll 67 is released and remains so until near the end of the forward movement of the carriage when it is again engaged by the striker to depress the stock and thereby cause the knife to emerge from the stock.

When the knife is caused to move through the stock to gouge out a groove there is a strong tendency for the stock to be lifted from the bed, and in order to counteract this tendency and to hold the stock firmly during the cutting operation, the plate 11 has fastened to it two holding members 77 the operative adjacent faces of which are undercut and provided with teeth, as shown, to engage opposite edges of the stock. In the illustrative construction these members converge toward each other in the general direction of the forepart of the sole so as to grip the shank firmly.

In order still further to provide against the lifting of the sole from the bed there is fastened to the carriage 15, by means of screws 83, a presser 85 of substantially the same width as the knife or cutter 17, said presser being designed to travel in the groove. Commonly the groove is about one thirty-second of an inch in depth, and the edge of the knife 17 projects about that distance below the face of the presser.

Figures 2, 3:
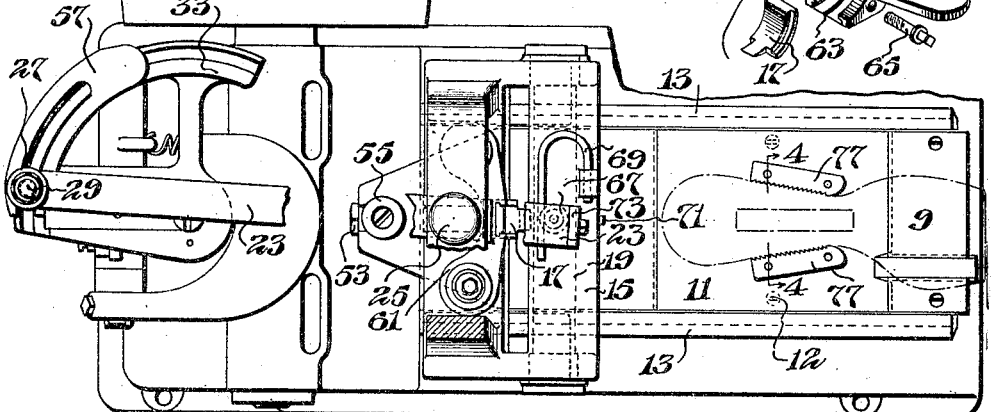
Fig. 2 is a plan of the machine.
Fig. 3 is an elevation of the knife holder, the knife and the means for holding the knife in adjusted position.
Figures 4, 7:
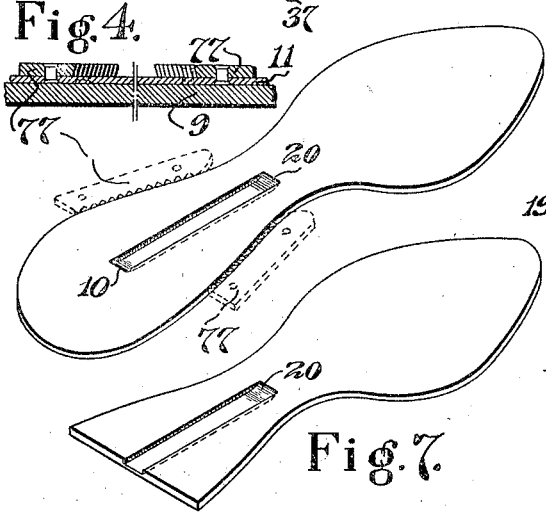
Fig. 4 is a cross-section on the line 4—4 of Fig. 2.
Fig. 7 is a perspective of a three-quarters sole which has also been operated upon.
Figures 5, 6:
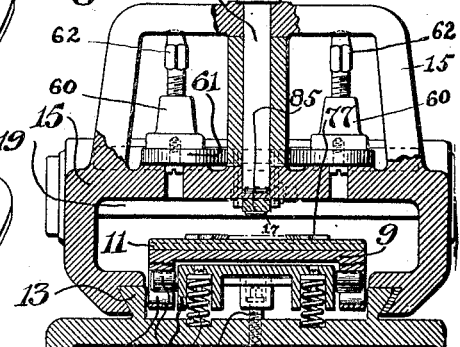
Fig. 5 is a cross-section on the line 5—5 of Fig. 1.
Fig. 6 is a perspective of a full length sole which has been operated upon by the machine.

The operation of the machine is as follows: With the parts of the machine in the positions shown in Figs. 1 and 2, the sole is placed on the bed between the holding members, as shown in said figures, and the one-revolution clutch thrown in. The following movements and operations then take place. The carriage starts forward and the roll 67 is released, whereupon the gage 19 is moved by the spring 69 to the limit of its clockwise movement, thereby bringing its operative face above the knife a distance equal to the depth of the groove to be cut. The actuating member 57 contacts with the roll 55 to raise the bed and maintain it in raised position for an interval. The raising of the bed causes the knife to enter the stock at the point marked 10 in Fig. 6; and as the knife is moved forward it gouges out the groove, the depth of which depends upon the extend to which the knife projects below the presser 85 and upon the position in which the gage 19 is held. Just prior to the end of the forward stroke of the carriage, the striker 73 engages the roll 67 to move the gage 19 in a counter-clockwise direction, thereby depressing the stock and causing the knife to emerge from it at the point marked 20. The end of the actuating member 57 runs off from the roll 55 whereupon the bed is lowered by the action of the spring 49. This occurs approximately at the end of the forward stroke of the carriage, after which the carriage moves back, and the parts come to rest in the position shown. When the groove shown in Fig. 7 is cut, the movements of the machine are the same but the upward movement of the bed caused by contact of the actuating member 57 with the roll 55 takes place before the knife enters the sole.

The purpose of the removable plate 11 is to provide for soles of different sizes and contours; and with each machine there is furnished a set of plates carrying holding members located to receive the particular shapes and sizes of soles which are to be operated upon.

Having thus described my invention, what I claim as new and desire to secure by Letters Patent of the United States is:

1. A machine of the class described, having, in combination, a bed for supporting a sole, means rigid with the bed for holding the sole down upon the bed, a cutter, and means for causing the cutter to produce a groove extending longitudinally of the sole in the shank portion thereof.

2. A machine of the class described, having, in combination, a bed for supporting the sole, means rigid with the bed for holding the sole down upon the bed, a cutter having its cutting edge inclined to the surface of the bed, and means for causing the cutter to gouge a groove extending longitudinally in the shank portion of the sole.

3. A machine of the class described, having, in combination, a bed for supporting a piece of stock, a cutter, means for producing relative movement between the bed and cutter to cause the cutter in two directions to enter, travel along in and emerge from the stock, a gage located in advance of the cutter, and means rigid with the bed for preventing the stock from being lifted from the bed by the action of the cutter.

4. A machine of the class described, having, in combination, a substantially flat bed for supporting the stock, a cutter, means for producing relative movement between the bed and cutter in one direction to cut the main portion of a groove and in another direction to cause the knife to emerge from the stock, a gage co-operating with the cutter, to determine the depth of the cut, and means for preventing the stock from being lifted from the bed.

5. A machine of the class described, having, in combination, a bed for supporting a piece of stock, a cutter, one of said members being yieldable away from the other, means for producing relative movement between the members to cause the cutter to enter the stock, and means, rigid with the bed, for holding the stock down upon the bed.

6. A machine of the class described, having, in combination, a bed for supporting a sole, means mounted upon the bed for engaging opposite edges of the shank portion of the sole to hold it down upon the bed, and means for cutting a groove in the shank portion of the sole.

7. A machine of the class described, having in combination, a bed for supporting a piece of stock, a gouging cutter, means for causing relative movement of the bed and cutter in a direction to cause the bed to be traversed by the cutter, and for causing approach and separation of the bed and cutter, and means running in the groove made by the cutter for holding the stock down upon the bed.

8. A machine of the class described, having in combination, a bed for supporting a piece of stock, a gouging cutter, means for causing relative movement of the bed and cutter in a direction to cause the bed to be traversed by the cutter and for causing approach and separation of the bed and cutter, a gage located in front of the knife, a presser located in the rear of the knife, and means carried by the bed for holding the stock thereon.

9. A machine of the class described, having in combination, a bed for supporting a piece of stock, a gouging cutter, means for causing relative movement of the bed and cutter in a direction to cause the bed to be traversed by the cutter and for causing approach and separation of the bed and cutter, and a presser arranged to engage the stock at the bottom of the groove made by the cutter.

10. A machine of the class described, having, in combination, means for suporting a piece of stock, a cutter, means for producing relative movement between the cutter and the supporting means to cause the cutter to operate upon the stock, and a presser arranged to act upon a surface of the stock which is formed by the action of the cutter in such manner as to press the stock against the support.

11. A machine of the class described, having, in combination, means for supporting a piece of stock, a cutter, means for moving the cutter over the supporting means to cause a groove to be cut in the stock, and a presser movable with the cutter and arranged to enter the groove.

12. A machine of the class described, having, in combination, means for supporting a piece of stock, a cutter, means for producing relative movement between the cutter and the supporting means to cause a groove to be cut in the stock, and a presser held from movement with respect to the cutter and arranged to enter the groove.

13. A machine of the class described, having, in combination, a bed for supporting a piece of stock, said bed comprising a table and a removable and replaceable plate having stock holding means rigidly mounted thereon, a tool, and means for causing relative movement between the tool and the bed.

In testimony whereof I have signed my name to this specification.

FREDERICK M. FURBER.

Certificate of Correction.

It is hereby certified that in Letters Patent No. 1,441,222, granted January 9, 1923, upon the application of Frederick M. Furber, of Revere, Massachusetts, for an improvement in "Shank-Gouging Machines," errors appear in the printed specification requiring correction as follows: Page 2, line 28, for the word "make" read *makes;* same page, line 125, for the word "extend" read *extent;* page 3, line 47, claim 3, strike out the words "in two directions" and insert the same to precede the word "to", first occurrence, in the same line; and that the said Letters Patent should be read with these corrections therein that the same may conform to the record of the case in the Patent Office.

Signed and sealed this 27th day of February, A. D., 1923.

[SEAL.]

KARL FENNING.
*Acting Commissioner of Patents.*